(12) United States Patent
Ziemer (10) Patent No.: US 7,682,281 B2
(45) Date of Patent: Mar. 23, 2010

(54) PLANETARY TRANSMISSION, ESPECIALLY DUAL-CLUTCH PLANETARY TRANSMISSION

(75) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 322 days.

(21) Appl. No.: 10/593,380

(22) PCT Filed: Jan. 29, 2005

(86) PCT No.: PCT/EP2005/000902

§ 371 (c)(1),
(2), (4) Date: Oct. 10, 2006

(87) PCT Pub. No.: WO2005/098271

PCT Pub. Date: Oct. 20, 2005

(65) Prior Publication Data

US 2007/0184931 A1    Aug. 9, 2007

(30) Foreign Application Priority Data

Mar. 23, 2004   (DE) .................. 10 2004 014 081

(51) Int. Cl.
*F16H 3/62* (2006.01)
(52) U.S. Cl. .................. 475/275; 475/288; 475/311; 475/329; 475/330
(58) Field of Classification Search .................. 475/275, 475/288, 311, 329, 330
See application file for complete search history.

(56) References Cited

U.S. PATENT DOCUMENTS

| 2,150,950 | A | | 3/1939 | Thoma |
| 2,209,385 | A | | 7/1940 | Burtnett |
| 2,530,200 | A | | 11/1950 | Hobbs |
| 4,395,925 | A | | 8/1983 | Gaus |
| 5,879,263 | A | * | 3/1999 | Haka ........................ 475/276 |
| 6,524,208 | B1 | | 2/2003 | Hollermann et al. |
| 6,572,507 | B1 | | 6/2003 | Korkmaz et al. |
| 6,663,528 | B1 | * | 12/2003 | Haka ........................ 475/303 |

(Continued)

FOREIGN PATENT DOCUMENTS

DE      1 211 077      2/1966

(Continued)

*Primary Examiner*—David D Le
(74) *Attorney, Agent, or Firm*—Davis & Bujold, P.L.L.C.

(57) ABSTRACT

A dual-clutch planetary transmission comprising a plurality of planetary gearsets, two frictionally engaged gearshifting element for connecting various power trains to a power flux and a plurality of form-fit gearshifting elements for adjusting various gear ratios in the power trains. The frictionally engaged gearshifting elements and the form-fit gearshifting elements are arranged between the shafts of the planetary gearsets, a housing and a transmission input shaft and a transmission output shaft so that the gear ratio can be changed in a lower gear ratio range, via the frictionally engaged gearshifting elements, without any interruption of tractive force. At least one of the frictionally engaged gearshifting elements is a clutch. The form-fit gearshifting element, the frictionally engaged gearshifting elements and the planetary gearsets are positioned within the housing and can be interlinked so that the form-fit gearshifting elements can be actuated without insertion through rotating parts.

23 Claims, 8 Drawing Sheets

U.S. PATENT DOCUMENTS

| | | | |
|---|---|---|---|
| 6,663,529 B1 * | 12/2003 | Haka | 475/303 |
| 6,669,596 B1 | 12/2003 | Sefcik | |
| 7,128,682 B2 * | 10/2006 | Haka | 475/275 |
| 7,175,563 B2 * | 2/2007 | Baldwin | 475/276 |
| 2003/0199360 A1 | 10/2003 | Biallas | |
| 2003/0232689 A1 * | 12/2003 | Haka | 475/303 |
| 2004/0023748 A1 * | 2/2004 | Haka | 475/303 |

FOREIGN PATENT DOCUMENTS

| | | |
|---|---|---|
| EP | 1 389 696 A2 | 2/2004 |
| EP | 1 435 477 A2 | 7/2004 |
| GB | 2 103 736 A | 2/1983 |
| WO | WO-2004/020238 A2 | 3/2004 |

* cited by examiner

Fig. 1

| | K1 | K2 | E | B | F | A | C | D | eta | i_ges | phi |
|---|---|---|---|---|---|---|---|---|---|---|---|
| "1" | ● | | | | | ● | | ● | 0.980 | 5.333 | 1.73 |
| "2" | ● | ● | | | | ● | ● | | 0.977 | 3.083 | 1.32 |
| "3" | | ● | | | ● | ● | | | 0.980 | 2.333 | 1.32 |
| "4" | | ● | | ● | | ● | | | 0.986 | 1.762 | 1.32 |
| "5" | ● | | ● | | | ● | | | 0.995 | 1.333 | 1.32 |
| "6" | ● | | ● | | ● | | | | 1.000 | 1.000 | 1.33 |
| "7" | | ● | ● | | | | ● | | 0.995 | 0.750 | 1.33 |
| "R" | ● | ● | | ● | | | | ● | 0.980 | -3.000 | 7.11 |

| | K1 | K2 | E' | E | B | F | A | C | D | eta | i_ges | phi |
|---|---|---|---|---|---|---|---|---|---|---|---|---|
| "1" | ● | | | | | | ● | | ● | 0.980 | 5.333 | 1.73 |
| "2" | ● | ● | | | | ● | ● | ● | | 0.977 | 3.083 | 1.32 |
| "3" | | ● | | | | ● | ● | | | 0.980 | 2.333 | 1.32 |
| "4" | ● | | ● | | ● | | ● | | | 0.986 | 1.762 | 1.32 |
| "5" | ● | ● | ● | ● | ● | | ● | | | 0.995 | 1.333 | 1.33 |
| "6" | ● | ● | | ● | | ● | | | | 1.000 | 1.000 | 1.33 |
| "7" | ● | ● | | | | | | ● | | 0.995 | 0.750 | 1.33 |
| "R" | ● | ● | | | ● | | | | ● | 0.980 | -3.000 | 7.11 | i_0_P1 = -3,00
i_0_P2 = -3,00
i_0_P3 = -3,00

| | K1 | K2 | E" B | F | A | C | D | eta | i_ges | phi |
|---|---|---|---|---|---|---|---|---|---|---|
| "1" | ● | | | | ● | | ● | 0.980 | 5.333 | 1.73 |
| "2" | ● | ● | | | ● | | | 0.977 | 3.083 | 1.32 |
| "3" | | ● | | ● | ● | | | 0.980 | 2.333 | 1.32 |
| "4" | | | ● | | ● | | | 0.986 | 1.762 | 1.32 |
| "5" | | | ● | | ● | | | 0.995 | 1.333 | 1.33 |
| "6" | | ● | ● | ● | | | | 1.000 | 1.000 | 1.33 |
| "7" | | ● | | | | ● | | 0.995 | 0.750 | 1.33 |
| "R" | ● | ● | ● | | | | ● | 0.980 | -3.000 | 7.11 | i_0_P1 = -3,00
i_0_P2 = -3,00
i_0_P3 = -3,00

|   | K1 | K2 | E" | A' | B | F | C | D | eta | i_ges | phi |
|---|----|----|----|----|---|---|---|---|------|-------|------|
| "1" | ● |   |   | ● |   |   |   | ● | 0.980 | 5.333 | 1.73 |
| "2" | ● | ● |   | ● |   |   | ● |   | 0.977 | 3.083 | 1.32 |
| "3" |   | ● |   | ● |   | ● |   |   | 0.980 | 2.333 | 1.32 |
| "4" |   |   | ● | ● | ● |   |   |   | 0.986 | 1.762 | 1.32 |
| "5" |   |   | ● | ● |   | ● |   |   | 0.995 | 1.333 | 1.33 |
| "6" | ● |   | ● |   |   |   | ● |   | 1.000 | 1.000 | 1.33 |
| "7" | ● | ● |   |   |   |   |   |   | 0.995 | 0.750 | 1.33 |
| "R" |   | ● |   |   | ● |   |   | ● | 0.980 | -3.000 | 7.11 | i_0_P1 = -3,00
i_0_P2 = -3,00
i_0_P3 = -3,00

PLANETARY TRANSMISSION, ESPECIALLY DUAL-CLUTCH PLANETARY TRANSMISSION

This application is a national stage completion of PCT/EP2005/000902 filed Jan. 29, 2005 which claims priority from German Application Serial No. 10 2004 014 081.2 filed Mar. 23, 2004.

FIELD OF THE INVENTION

The invention concerns a planetary transmission, especially a dual-clutch version made in the manner of a planetary transmission with a plurality of gear sets, with at least two frictional shifting elements and with a plurality of shape-fit, shifting devices.

BACKGROUND OF THE INVENTION

The practice has made known step-wise automatic transmissions, which are constructed, at least in the planetary transmission manner or are designed as auxiliary transmissions. Step-wise automatic transmissions, which are constructed in planetary transmission design are equipped with a hydro-dynamic torque converter as a starting element and with frictional shifting means so that, with this type of transmission, shifting can be carried out without an interruption in continuous traction. So that the motor torque in the drive string, which is conducted to the output drive shaft, can be transmitted by the frictional shifting element, it is necessary that these be relatively large in dimensioning whereby, however disadvantageously, in the shifting element, draw-power losses when towing or losses in the open state of the shifting element are large. Since the frictional shifting elements are generally mostly hydraulically operated, a large and complex hydraulic system with a hydraulic pumping system is necessary which, because of a pick-up capacity of the pump arrangement and by way of leakage losses, this leads to a deterioration of the efficiency of the transmission. The draw-power losses can be reduced by the insertion of a substitution for the frictional shifting element, whereby the gear-step exchange would then be carried out, but disadvantageously and with the occurrence of traction interruptions.

In order to execute traction interruption-free shifting with automatic step-wise transmissions, even of the auxiliary type, then these must be constructed as the so-called dual-clutch transmissions. This type of transmission possesses two frictional shifting elements by way of which, in the transmission, two power strings are shifted into the power flow of the transmission or, alternately, are shifted out of the power flow. In the two power strings, shape-fit, shifting element gear pairings of various ratios, have the capability of the shifting "into" or "out of". In this case, the ratios of the power strings can then be adjusted or changed, if the currently employed power string is not precisely shifted into the power flow, but rather finds itself in a load-free condition. In the area of the employed, shape-fit, shifting elements, in comparison to the frictional shifting elements, there appears the essentially smaller traction torque of a planetary transmission so that, in this case, losses of lesser magnitude occur and a total transmission efficiency in a small assembly is enhanced.

The dual-clutch transmissions, which are made in the auxiliary-transmission method are, in comparison to planetary gear transmissions, disadvantageous because of being characterized by a lower power density wherein, for example, in regard to the same gear stage, they require more construction space, which space, especially in the case of motor vehicles, has a very limited availability.

Further, an effective gear efficiency of an auxiliary transmission lies somewhat at the lower level of hand-shifting, which is caused by the known dual spur gear engagement. Contrary to this, planetary gear transmissions possess an efficiency, which is governed by the currently involved gear set scheme. This is true especially in the principal gears for driving and the transmission efficiency is higher than in the case of a coaxially designed auxiliary transmission.

DE 31 31 138 A1 discloses a changeable transmission based on a load carrying, planetary gear. This is intended for motor vehicles with automatic transmission control and having a plurality of interlocked, planetary gear sets. The vehicles are known to have shifting clutches and shifting brakes for the formation of drive strings with different ratios as well, in which only two shifting clutches which, for example, are installed on the motor drive shaft as load shifting clutches and which, as directed, principally transmit drive torque over two drive strings. The remaining shifting clutches and shifting brakes can then always be shifted if they are not already included in the transfer of the torque. By means of appropriate selection of and the arrangement of the coupled planetary gear sets, shifting clutches and shifting brakes in combination with the two load shifting clutches, there arises a high multiple usage of the individual construction elements as well as gaining a simple assembly with satisfactory ratios and a comparative number of gear positions.

As disclosed by DE 31 31 138 A1, the known, load-shiftable planetary transmission, however, exhibits the disadvantage, that the shape-fit, shifting elements are controlled throughout by the rotating components of the planetary transmission, whereby a faultless functionality is attained only objectionably because of a very high technically complex manufacture with resulting undesirable high fabrication costs.

The present invention has the purpose of making a planetary transmission available, which is of low cost in its manufacture.

Within the field of the invention, this purpose is achieved with a planetary transmission.

SUMMARY OF THE INVENTION

The invented planetary transmission possesses a plurality of planetary gear sets. The transmission has at least two frictional shifting elements for the attainment of various selections in power flow and possesses a plurality of shape-fitting elements for the imposition of different gear ratio steps. Further, the frictional shifting elements and the shape-fitting elements are so inserted between the shafts of the planetary gear set, a housing, and well as between a transmission input shaft, that gear step change at least in one lower gear step range, can be carried out free of interruption of traction. In addition, at least one of the frictional shifting elements is designed as a clutch. The assembly of the above is simple and economical in its manufacture.

This favorable situation is attained in that the shape-fit, shifting elements, the frictional shifting elements and the planetary gear sets are positioned in the housing in such a manner and can be so operationally combined that an activation of the shape-fit, shifting elements can be accomplished without involvement with rotating components of the planetary transmission.

In the case of an advantageous embodiment of the invented planetary transmission, the frictional shifting elements are placed between the shape-fit, shifting elements and the planetary gear sets, whereby the frictional shifting elements are connected by way of their half-clutches proximal to the transmission output, directly with two different shafts of the planetary gear sets and are in operational communication by their half-clutches proximal to the transmission input side with the shape-fit, shifting elements.

With the invented planetary transmission, advantageously, shifting, i.e., gear stage changing at least in a lower gear stage range, which is to say, the main travel area can be carried out free of traction interruptions with transmission-efficiency in the individual gear stages, which transmission-efficiency is essentially superior to the transmission-efficiency of an auxiliary transmission.

In accordance with the invention, this state is arrived at in that the planetary transmission is made with a plurality of planetary gear sets, which are characterized by a high efficiency. Additionally, these planetary gear sets allow various ratio stages, i.e., gear stages, to be shifted into by way of the connection of individual shafts of the planetary gear sets by shape-fit, shifting elements which, in comparison to frictional shifting elements, are noted by their very small slip moments.

Additionally, two frictional shifting elements are provided, which allow that alternately by way of the shape-fit, shifting, elements, shifting can be carried out into power paths generated by the planetary transmission and thus into the power flow or conversely shifting can be out of the power flow. This allows that those shape-fit, shifting elements, which are arranged in a power train, which train is not actually in the power flow, can now be shifted. This shifting is without load and is a change from an already shifted into power path, which itself represents the current gear stage in the power flow of the planetary transmission. The change is a downshift to a power path which represents a new, but higher or lower gear stage in which various shafts of the planetary gear sets bind themselves together or advantageously bind against a housing-affixed component. The shape-fit, shifting elements allow such cross-shifting to be carried out free of any break in the transmission output power delivery, i.e., traction.

In addition, the frictional shifting elements and the shape-fit, shifting elements, in the case of planetary transmission are so arranged that different gear ratio stages can be attained in the planetary gear set, respectively by way of a power path shifted into by a load-free shifting element prior to the power flow of the respective planetary transmission. Subsequently, the power path of the new gear stage is picked up by the closure of the opened frictional shifting elements in the power flow of the transmission. As this is carried out, actually within the power flow of the gear stage to be shifted out of, the power path is conducted out of the power flow by the opening of the closed frictional element.

Immediately following the above, the power path of the downshifted gear stage is free of load, whereby now the possibility is present of changing the gear ratio of the load-free power path of the respective planetary gear set by way of appropriate shifting of the shape-fit, shifting element. Thus a shifting free of traction interruption or a gear change free of traction interruption can be carried out under load free condition in connection with a gear ratio change in an invented planetary gear set by an alternate "in" or "out" down shifting of the two frictional shifting elements.

Thus, an invented planetary gear set unites the advantages of a conventional planetary transmission. That is, a high power density with a favorable percentage of gear efficiency, combined with the advantages of a dual-clutch transmission which has been constructed in an auxiliary manner, allows shiftings, which are free of traction interruptions to be carried out with low slip torques in the area of the shifting element.

BRIEF DESCRIPTION OF THE DRAWINGS

The invention will now be described, by way of example, with reference to the accompanying drawings, described as operational principles, whereby in the description of the examples, for the sake of clarity, the same reference numerals are used for the same, or for similarly functional components. There is shown.

DETAILED DESCRIPTION OF THE INVENTION

Figure 1:
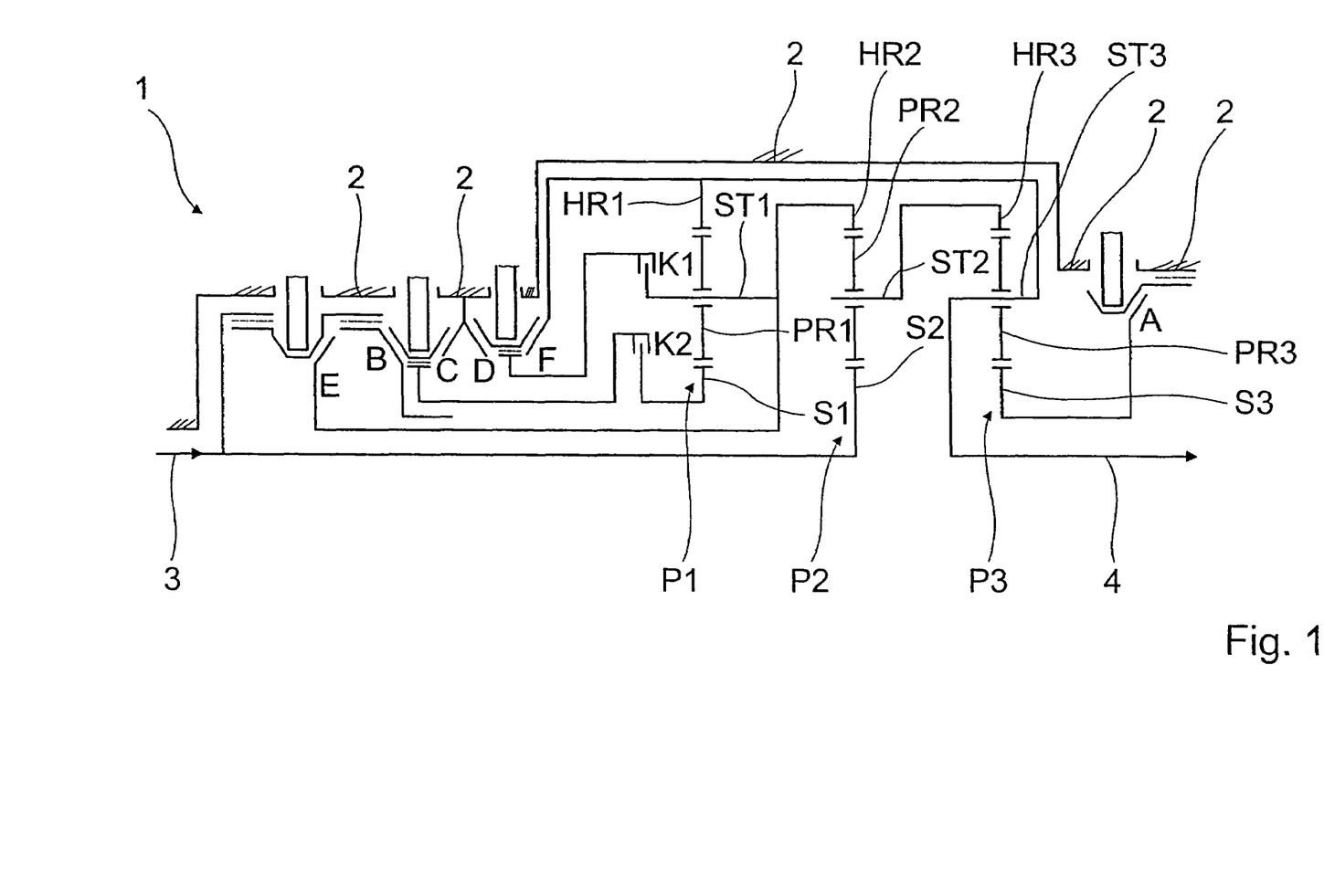
FIG. 1 is a schematic view of a planetary gear transmission constructed in accordance with the invention.
Figure 3:
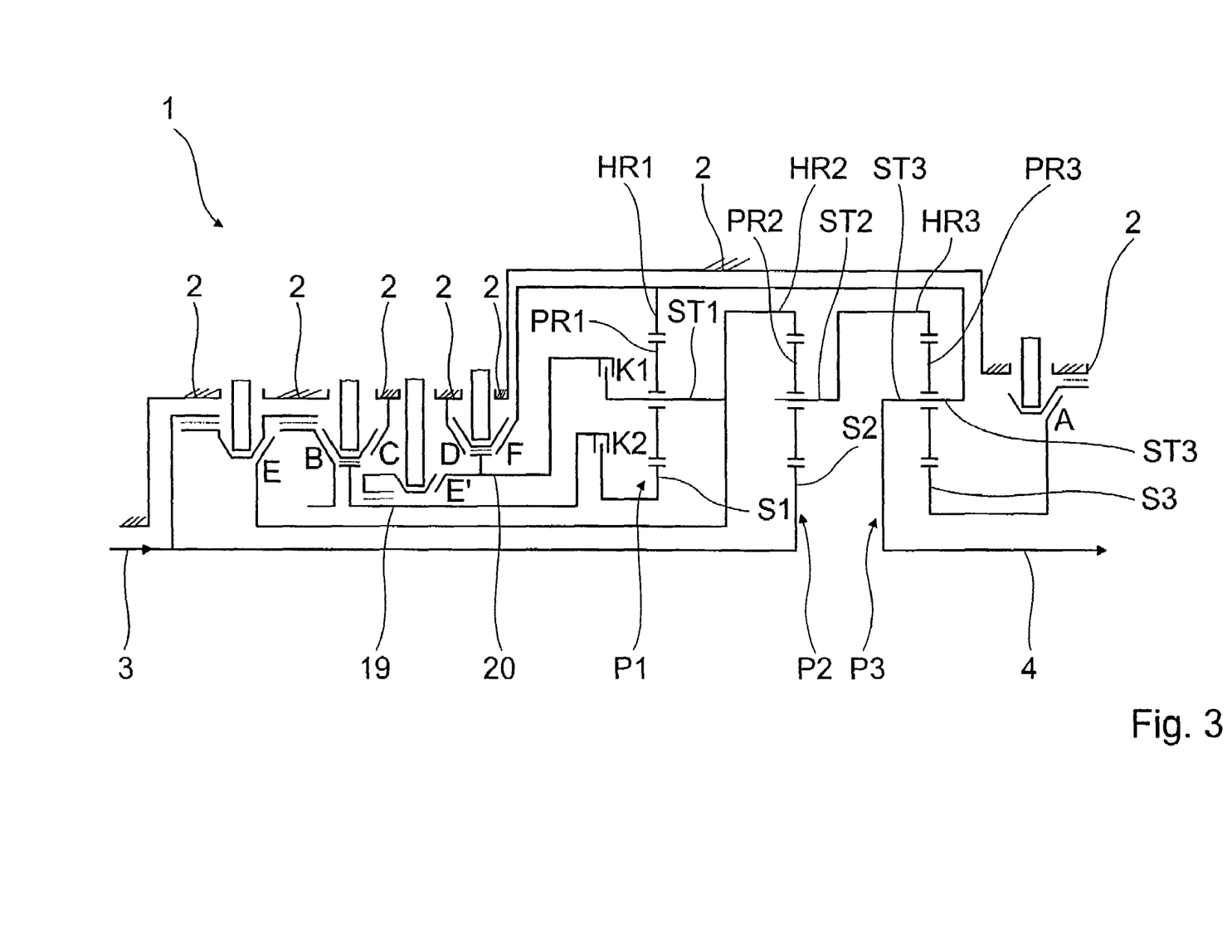
FIG. 3 is a schematic view of an additional embodiment example of an invented planetary gear transmission.
Figure 5:
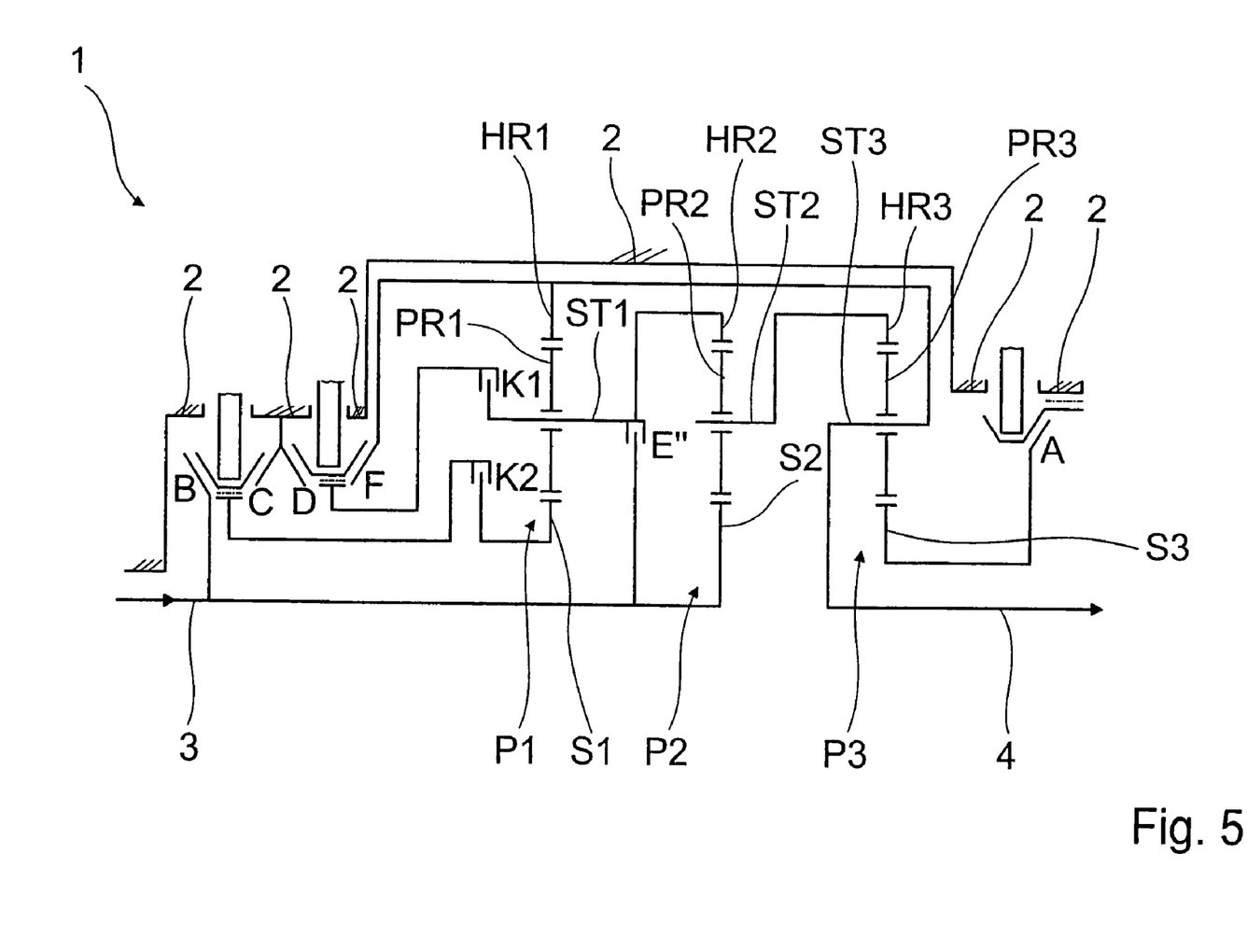
FIG. 5 is a schematic view of an additional embodiment example of a planetary gear transmission in accordance with the invention.

FIG. 1, FIG. 3 and FIG. 5 are, respectively, schematic drawings of gear arrangements relative to three embodiment examples showing planetary transmissions 1 in accordance with the invention. That is to say, the shown transmissions are dual-clutch transmissions, designed according to planetary principles, having three planetary gear sets P1 to P3, two frictional shifting elements K1, K2 and with a multiplicity of shape-fit, shifting elements A, B, C, D, E and F, all of which conform to the principal method of construction. On this account, in the following description to FIG. 3 and to FIG. 5, essentially the discussion will relate to the difference from the gear scheme of FIG. 1.

The shifting elements A, B, C, D, E and F relate to the respective application case presently in hand, either being made as synchronized or as non-synchronized, shape-fit, shifting elements, whereby in the synchronized design, eventual existing different speeds of rotation between two components of the planetary transmission 1, which components can be connected by a shape-fit, shifting element, are compensated in rotational speed in a simple manner. The frictional shifting elements K1 and K2 are, are actually made as frictional, lamella clutches, whereby, as would be obvious in an expert's opinion, the frictional shifting elements K1 and K2 can be designed as wet or dry running clutches or at least one or both of the two shifting elements can be designed as frictional brakes.

The frictional shifting elements K1 and K2 are provided for the shifting of various power paths in a power flow of the planetary transmission 1, which can have seven forward gear stages and one reverse gear stage. The shape-fit, shifting elements A to F serve for the attainment of various ratio stages in the power paths of the planetary transmission 1.

In the case of the planetary transmission shown in FIG. 1, the two frictional shifting elements K1 and K2 are placed between the shape-fit, shifting elements B, C, D, E and F and the three planetary gear sets P1, P2, and P3. Further, the three planetary gear sets P1, P2 and P3 form a 3-carrier-6-shaft-gear train unit. The individual shafts of the three planetary gear sets P1 to P3 are bound together in such a manner that the 3-carrier-6-shaft-gear train unit brings about comparative low support factors in the shifting elements of the planetary transmission 1 and a high gear efficiency at simultaneously low rotational speed of the planetary gears. Further, the transmission unit, formed from the three planetary gear sets P1 to P3, is characterized by an advantageous stepping and a high spread at comparatively low construction costs.

A carrier ST1 of the first planetary gear set P1 is bound to an internal gear HR2 of the second planetary gear set P2 and an internal gear HR1 of the first planetary gear set P1 is connected to a carrier ST3 of the third planetary gear set P3. A sun gear S2 of the second planetary gear set P2 is bound with the transmission input shaft 3 and a carrier ST2 of the second planetary gear set P2 is connected to an internal gear HR3 of the third planetary gear set P3.

The first frictional shifting element K1 is, in the present embodiment, so placed that it enables the shape-fit, shifting element F or the shape-fit, shifting element D and the carrier ST1 of the first planetary gear set P1 to be brought into an operational connection. By way of the second frictional shifting element K2, the shape-fit, shifting element B or the shape fit shifting element C can be brought into an operative connection with a sun gear S1 of the first planetary gear set P1.

A sun gear S3 of the third planetary gear set P3 can be bound with a housing-affixed component by way of the shipfit shifting element A, i.e., with the transmission housing 2 of the planetary transmission 1, with the result that the sun gear S3 cannot be presented as rotationally free.

Further, a transmission input shaft 3 or a half-clutch of the shape-fit, shifting element E, in the case of a closed shifting element B, can be connected with a half-clutch of the second frictional shifting element K2. Additionally, the second frictional shifting element K2 can be bound with the housing-affixed component 2 by way of the shape-fit, shifting element C so that the sun gear S1 of the first planetary gear set P1 can be made rotationally fixed.

In the case of an engaged, shape-fit shafting element D, the first frictional shifting element K1 is bound to the housing-affixed component 2 so that the carrier ST1 of the first planetary gear set P1, upon a simultaneous closure of the first frictional shifting element K1, is made rotationally fixed.

The transmission input shaft 3, by way of the shape-fit, shifting element E, is connected with the carrier ST1 of the first planetary gear set P1 and with the internal gear HR2 of the second planetary gear set P2. The first frictional shifting element K1, by way of the shape-fit, shifting element F, is capable of being connected with the internal gear HR1 of the first planetary gear set P1 as well as with the carrier ST3 of the third planetary gear set P3.

Figure 2:
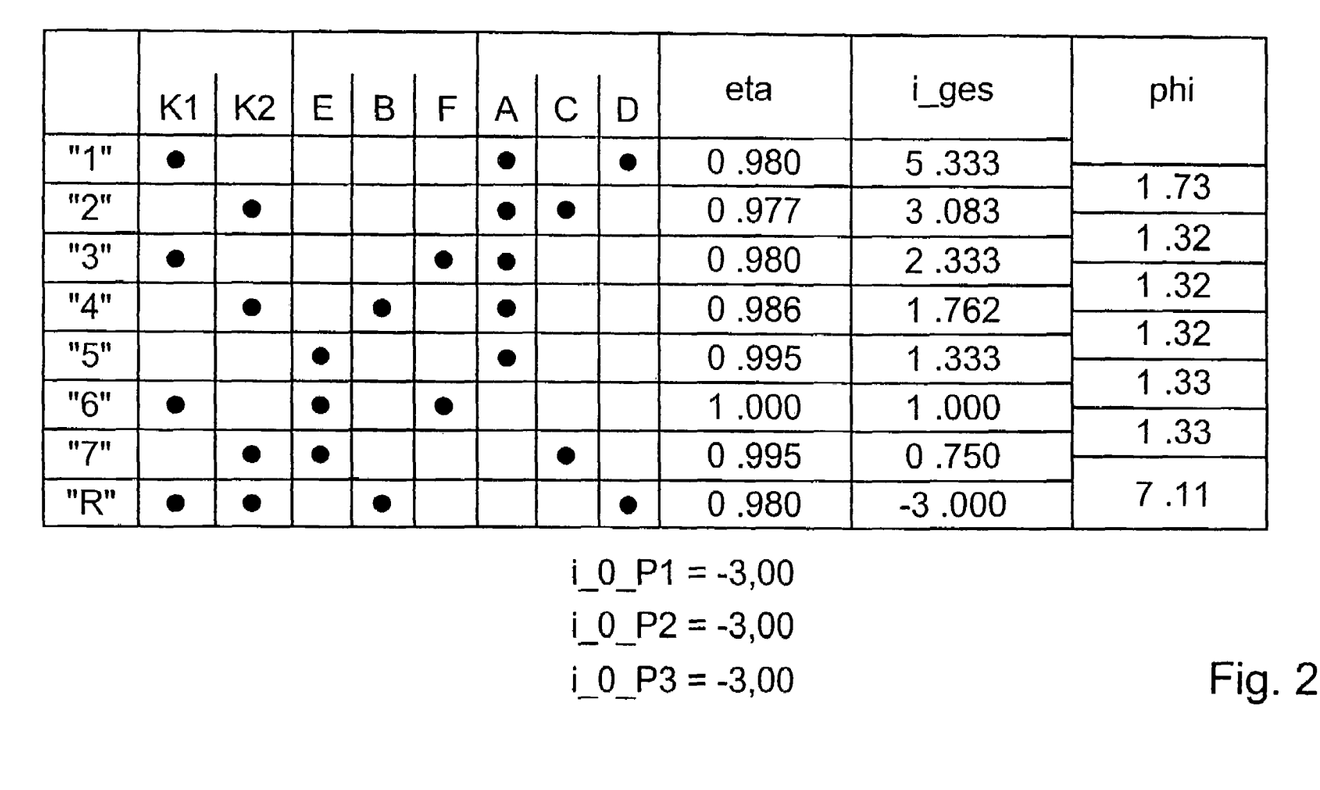
FIG. 2 is a schematic view of the shifting elements of the gear scheme in accordance with FIG. 1.
Figure 4:
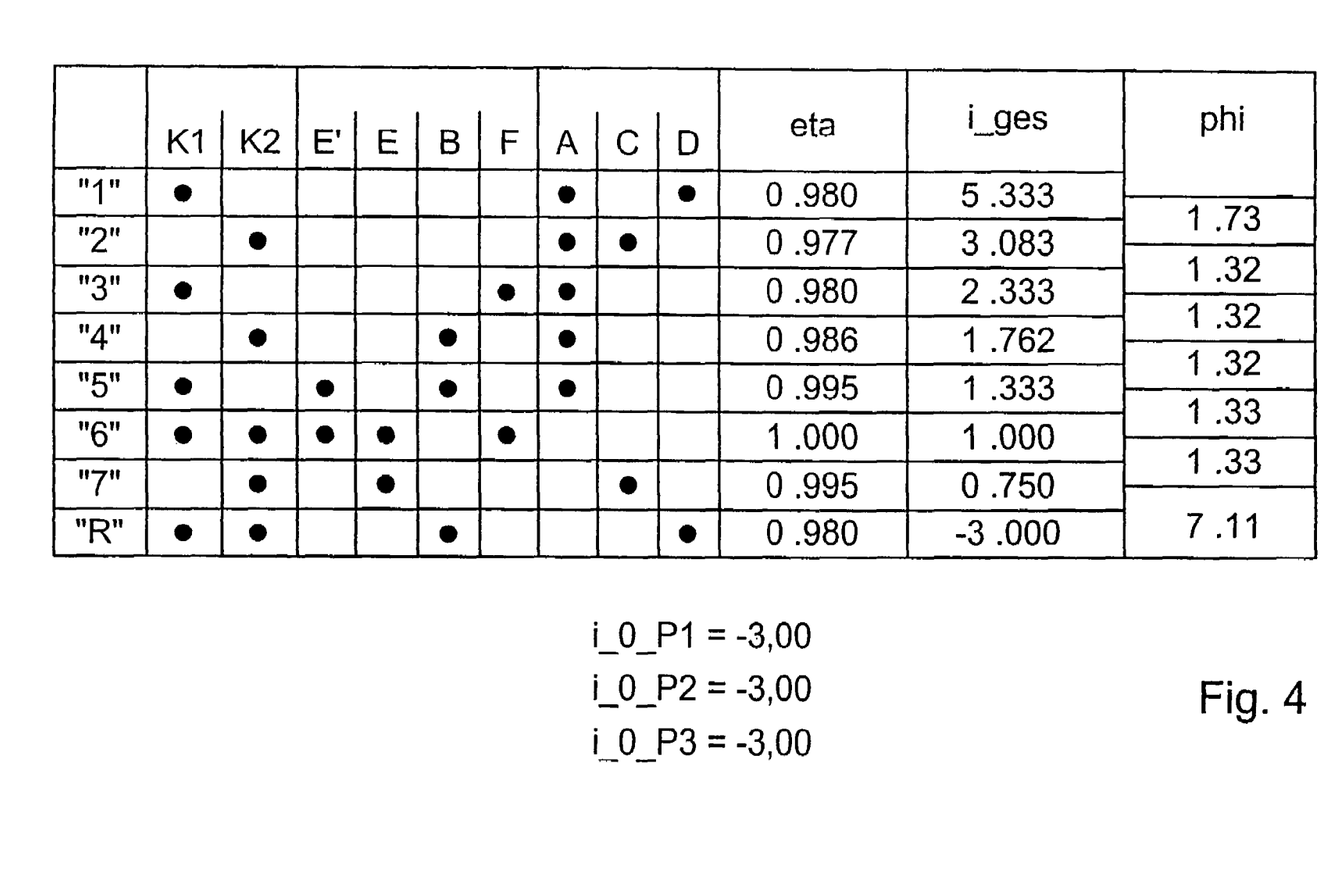
FIG. 4 is a schematic view of the shifting elements of The gear scheme depicted in FIG. 3.
Figure 6:
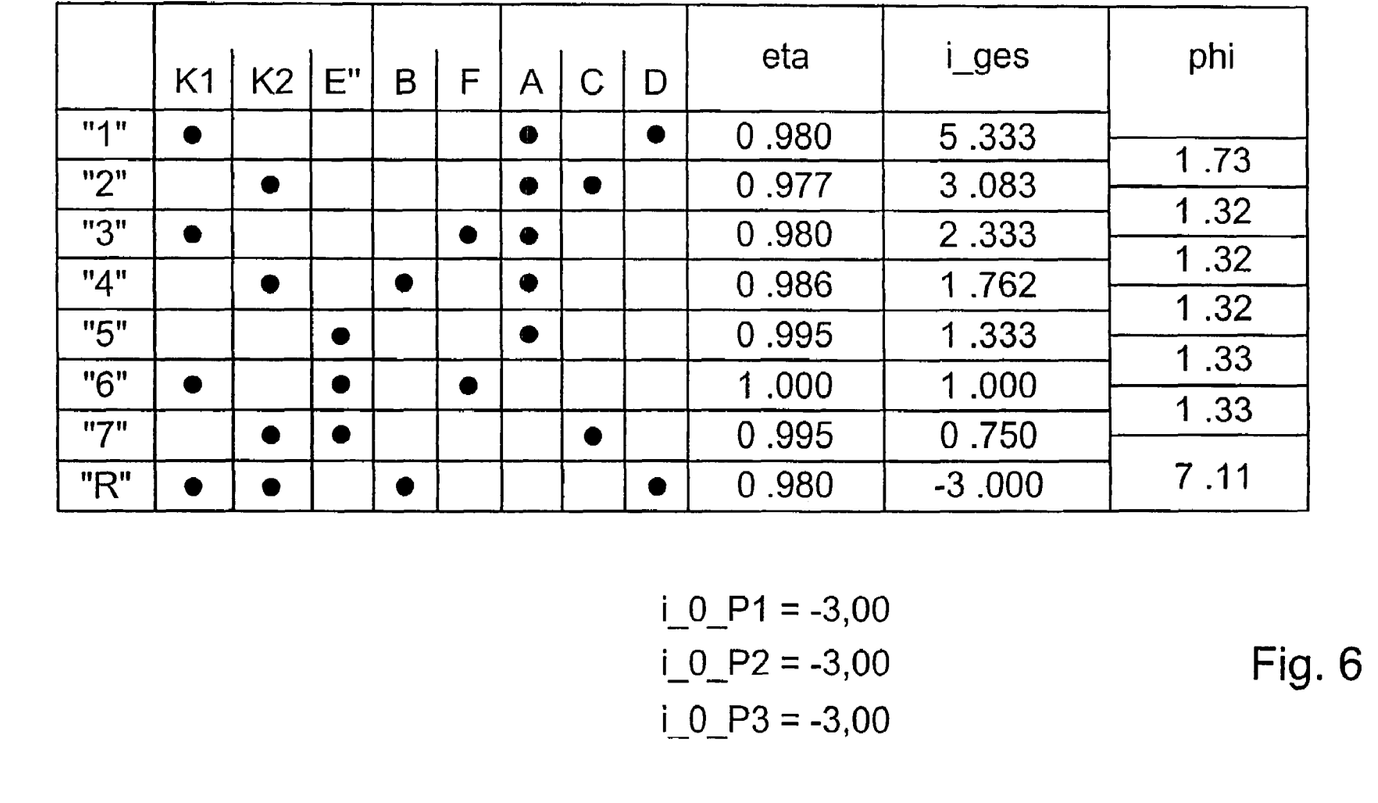
FIG. 6 is a schematic view of the gear scheme in accordance with FIG. 5.

FIG. 2, FIG. 4, and FIG. 6, respectively, shows a shifting scheme, which illustrates the interconnection between the individual gear stages, namely "1" to "7" and "R" of the planetary transmission 1 in accordance with FIG. 1, FIG. 3 or FIG. 5 and the shifting elements A to F as well as K1 and K2.

The shifting scheme of FIG. 2, FIG. 4 and FIG. 6 are arranged in the form of a table, in the head column of which the individual gear stages "1", "2", "3", "4", "5", "6", "7" are listed for forward movement and "R" for reverse travel. Further, in the top bar of the shifting scheme are to be found the individual shifting elements, namely, K1, K2, A, B, C, D, E, F, A', E' and E"; a gear efficiency rating eta of the planetary transmission 1; a total ratio i_ges of the planetary transmission 1, in accordance with the corresponding gear stage. Also a stage spring phi, which respectively is arrived at from a quotient of the values of two, successive total ratios i_ges. In addition, underneath the shifting scheme table is to be found the so-called characteristic ratio, namely i_O_P1=−3.0, i_O_P2=−3.0, i_O_P3=−3.0, of the planetary gear sets P1 to P3 with which the given total ratios i_ges in the respective gear stages and a total spread of 7.11 are arrived at.

Those shifting elements of the planetary transmission 1, which must be engaged for the attainment of a gear stage, are noted in the shifting scheme cells by a black dot, conversely, those cells exhibiting no black dot, indicate such shifting elements which are respectively disengaged.

It is evident from the shifting scheme of FIG. 2 and from the background of the gear scheme of the planetary transmission 1, as shown in FIG. 1, that in order to achieve the first gear stage "1", i.e., the first total ratio i_ges of the planetary transmission 1, that the shifting elements K1, A and D must be engaged, i.e., shifted into. In this operational situation of the planetary transmission 1, a torque of a driving machine of a motor vehicle, which torque has been introduced into the planetary transmission 1 by way of the transmission input shaft 3, gains access to a transmission output shaft 4 through a succession of the carrier ST1 of the first planetary gear set P1, the internal gear HR2, a planet gear PR2 and the carrier ST2 of the second planetary gear set P2, the internal gear HR3 of the third planetary gear set P3 and finally by way of the planet gears PR3 of the of the carrier ST3, both of the third planetary gear set P3. In this state, into which the planetary transmission 1 has been shifted, the drive torque of the transmission input shaft 3 is directed through a power branch of the planetary transmission 1, which was shifted into by way of the first frictional shifting element K1, of planetary transmission 1. The total ratio i_ges in the first gear stage "1" of the planetary transmission 1 has the value of 5.333 and the planetary transmission 1 is driven with an efficiency eta of 0.980.

To make clear the second gear stage "2", the two shape-fit, shifting elements A and C, as well as the second frictional shifting element K2, are closed, whereby an efficiency "eta" of the planetary transmission 1 assumes the value of 0.997 and the total ratio i_ges will equal 3.083. Therewith a stage spring phi of 1.72 becomes valid between the first gear stage 1 and the second gear stage 2 of planetary transmission 1.

The shifting accomplished by the first gear stage "1" in the second gear stage "2" of the planetary transmission 1 can be carried out in the planetary transmission 1, as shown in FIG. 1, without an interruption in the traction since, in the case of a corresponding shifting demand, first, the load-free, shape-fit, shifting element C is engaged, while the second frictional shifting element K2 is disengaged. Subsequently, the second frictional shifting element K2, advantageously corresponding to a self-actuated, superimposed shifting, is engaged by a slip phase while, simultaneously, the first frictional shifting element K1, in a corresponding manner, disengages. As this operation proceeds, the transfer capabilities of the two frictional shifting elements K1 and K2 are adjusted in such a manner by a control center of the planetary transmission 1 (not further described), that the gear stage exchange is free of interruption of traction and can be carried out in complete driving comfort.

After the ending of the gear stage exchange, i.e., the up-shifting, and after the power path has been previously shifted into by the second frictional shifting element K2, the drive torque of the transmission input shaft 3 is now transmitted through the power path of the planetary transmission 1 toward the transmission output shaft 4. Because of the disengaged first frictional shifting element K1, the load free, shifted, shape-fit, shifting element K1 can now, in a simple manner, be disengaged, so that by way of the shape-fit, shifting element D no more torque can be transmitted.

If an additional demand for an up-shifting is made with regard to the second gear stage "2" into the third gear stage "3" of the planetary transmission 1, then the load-free, shape-fit, shifting element F is engaged, which is allowed in a case of an open frictional shifting element K1. Subsequently, in the manner already explained, the transfer facility of the first frictional shifting element K1 is lifted and the transfer capability of the second frictional shifting element K2 is reduced, so that the power path of the planetary transmission 1, which was shifted into by the second frictional shifting element K2, is down-shifted and the power path now generated by the shape-fit, shifting element F in common with the shape-fit, shifting element A, is transferred by the first frictional shifting element K1 into the power flow of the planetary transmission 1. Subsequently, in a case of a disengaged second frictional shifting element K2, the load-free, shape-fit, shifting element C, can be disengaged in a simple way.

Further, in accordance with FIG. 2, the shifting scheme furnishes the information that the first frictional shifting element K1, for the acquiring of the gear stages "1", "3", "6" as well as the reverse stage "R" is engaged, while the second frictional shifting element K1 for the acquirement of the gear stages "2", "4", "7" and the reverse "R" is disengaged. The shiftings, i.e., both the shiftings up as well as into reverse, between the gear stages "1" to "4" and "6" and "7", are to be carried out by way of alternate up and down shiftings of the two frictional shifting elements K1 and K2. This can be accomplished without an interruption in traction, because the synchronized, shape-fit, shifting elements B, C, D and F belong to the load-free, engaged, immediately successive higher, i.e., the immediately successive lower, gear stage. Subsequently, the gear stage exchange is completed, by way of the engagement of the frictional shifting elements K1 or K2 which are assigned to the new gear, upon the simultaneous disengagement of the frictional shifting elements K2 or K1 which are assigned to the actually engaged gear.

Principally, the gear stage exchange between the fourth gear stage "4" and the fifth gear stage "5", as well as between the fifth gear stage "5" and the sixth gear stage "6" of the planetary transmission 1 in accordance with FIG. 1, cannot be carried out free of interruption of the traction. In order that it is possible to execute this shifting free of interruption in traction in the planetary transmissions of FIG. 3 and FIG. 5 depart, in partial areas, from the planetary transmission 1 in accordance with FIG. 1, whereby the shifting scheme, shown in FIG. 4 and FIG. 6, which respectively present shifting logic corresponding to planetary transmissions according to FIG. 3 and FIG. 5.

According to with FIG. 3, the planetary transmission is equipped with an additional synchronized shifting element E' of which one half-clutch is bound to the mutual direct connection of a shaft 19 which runs between shifting elements B and C and the first planetary gear set P1 and wherein another half-clutch is bound to an additional shaft 20 which leads to the first frictional shifting element K1. Because of the additional synchronized, shape-fit, shifting element E', the possibility now exists to run the shifting element E without synchronization. One gear stage exchange, between the fourth gear stage "4" and the fifth gear stage "5", can now be carried out free of interruption of traction by way of engaging the shifting element E' in a load-free condition and an immediately subsequent engagement of the first frictional shifting element K1 during a simultaneous opening of the second frictional shifting element K2.

A further up-shifting, which occurs between the fourth gear stage "4" and the fifth gear stage "5", is carried out in the same manner as in the case of the planetary transmission 1 in FIG. 1, wherein the power flow in the planetary transmission 1 must be interrupted for a short time for the purpose of disengaging the shape-fit, shifting element A and of engaging the shape-fit, shifting element F.

For the preparation of an additional up-shifting between the sixth gear stage "6" and the seventh gear stage "7", the shifting element E is engaged without a change in the speed of rotation. The blocking of the main gear set from the three planetary gear sets P1, P2 and P3 is now permitted by the simultaneous engaging shifting elements E, E', F and K1 whereby immediately, the second frictional shifting element K2 is disengaged. Subsequent to this, the shifting element E' is disengaged in the load-free condition whereby immediately following, the shifting element C can be engaged. In turn, and subsequent thereto, the actual up-shifting between the sixth gear stage "6" and the seventh gear stage "7" takes place by engagement of the second frictional shifting element K2 when, at the same time, the first frictional shifting element K1 is disengaged.

The gear scheme, shown in FIG. 5, differentiates itself from the gear scheme in FIG. 1 of the planetary transmission 1, in that the shape-fit, shifting element E of the construction, according the FIG. 1, is now appearing as frictional clutch E", whereby a half-clutch of the shifting element E" is bound to the transmission input shaft 3 and the other half-clutches with the carrier ST1 of the first planetary transmission P1 as well as with the internal gear HR2 of the second planetary gear set P2.

Because of the construction of the shifting element E" as a frictional clutch, a gear stage change between the fourth gear stage "4" and the fifth gear stage "5" of the planetary transmission 1 is accomplished in accordance with FIG. 9a by way of an engagement of the frictional shifting element E" and the immediate disengagement of the second frictional shifting element K2 without any interruption in the traction.

The up-shifting between the fifth gear stage "5" and the sixth gear stage "6" is done with traction interruption by way of engagement of the shifting element F and the disengagement of the shifting element A along with subsequent engagement of the first frictional shifting element K1. The up-shifting proceeding from the sixth gear stage "6" into the seventh gear stage "7" is, in turn, carried out by a load-free engagement of the shifting element C and a thereto connected engagement procedure of the second frictional shifting element K2 upon the simultaneous disengagement of the first frictional shifting element K1.

The various embodiments, shown in FIG. 1, FIG. 3 and FIG. 5 of the invented planetary transmission 1, bring methods of construction forward with the known advantages of a planetary transmission, that is to say, a high power density with favorable gear efficiency having the advantage of a dual-clutch system transmission, wherein shifting can be carried out free of traction interruptions and with low slip moments in the area of the shifting elements and unify and possess, in comparison to the achievement of purpose known from DE 31 31 138 A1, an assembly which is more simple, since all shape-fit, shifting elements can be directly controlled. That is, regulated without the necessity of the shifting collars, which are provided for the activation of the shape-fit, shifting elements and to run these through a rotating component of the planetary transmission.

The embodiment examples of the invented planetary transmission, which are found in FIG. 1 to FIG. 5, introduce a dual-clutch transmission in the planetary-type construction which, besides advantageous, synchronized, shape-fit, shifting elements A to F, introduce two shifting elements K1 and K2 outfitted as frictional lamella clutches as well as one main gear set, instead of three planetary gear sets P1 to P3. In a differentiation from to the planetary transmission as known from DE 31 31 138 A1, the clutches K1 and K2, in the case of the embodiments in accordance with FIG. 1 to FIG. 5, with their half-clutches proximal to the transmission output are connected directly to two different shafts of the main gear set, that is to say, to the carrier ST1 of the first planetary gear set P1 and the sun gear S1 of the first planetary gear set P1 and stand, with their half-clutches, which are proximal to the transmission input shaft, in connection with the synchronized, shape-fit, shifting elements.

Figure 7:
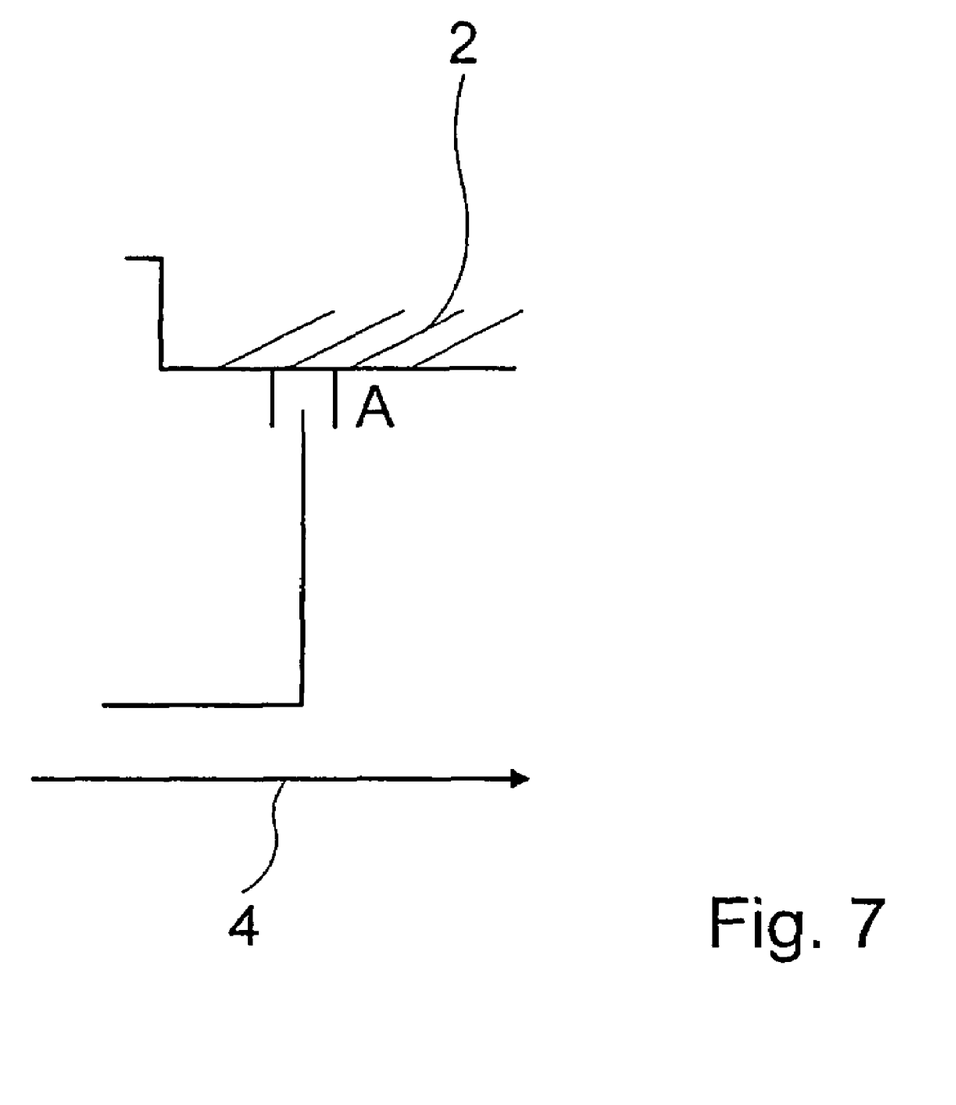
FIG. 7 is a schematic drawing of a frictional shifting element.

In FIG. 7 is shown from that shape-fit, shifting element A, alternate to that embodiment as presented in FIG. 1, FIG. 3 and FIG. 5, whereby the shifting element A, presented in the manner of FIG. 10 as being made as a a frictional shifting brake A', and thus the sun gear S3 of the third planetary gear set P3 can be braked against a housing-affixed component 2, i.e., the transmission housing of the planetary transmission 1. Thus it is possible that the shiftings, between the fifth gear stage "5" and the sixth gear stage "6", can be made without interruption in the traction. In a load-free condition, the shape-fit, shifting element F can be shifted in into the fifth gear stage "5". By engagement of the first frictional shifting element K1 and, at the same time, disengaging the frictional brake A', the shiftings between the fifth gear stage "5" and the sixth gear stage "6" can be executed without interruption of the traction.

Figure 8:
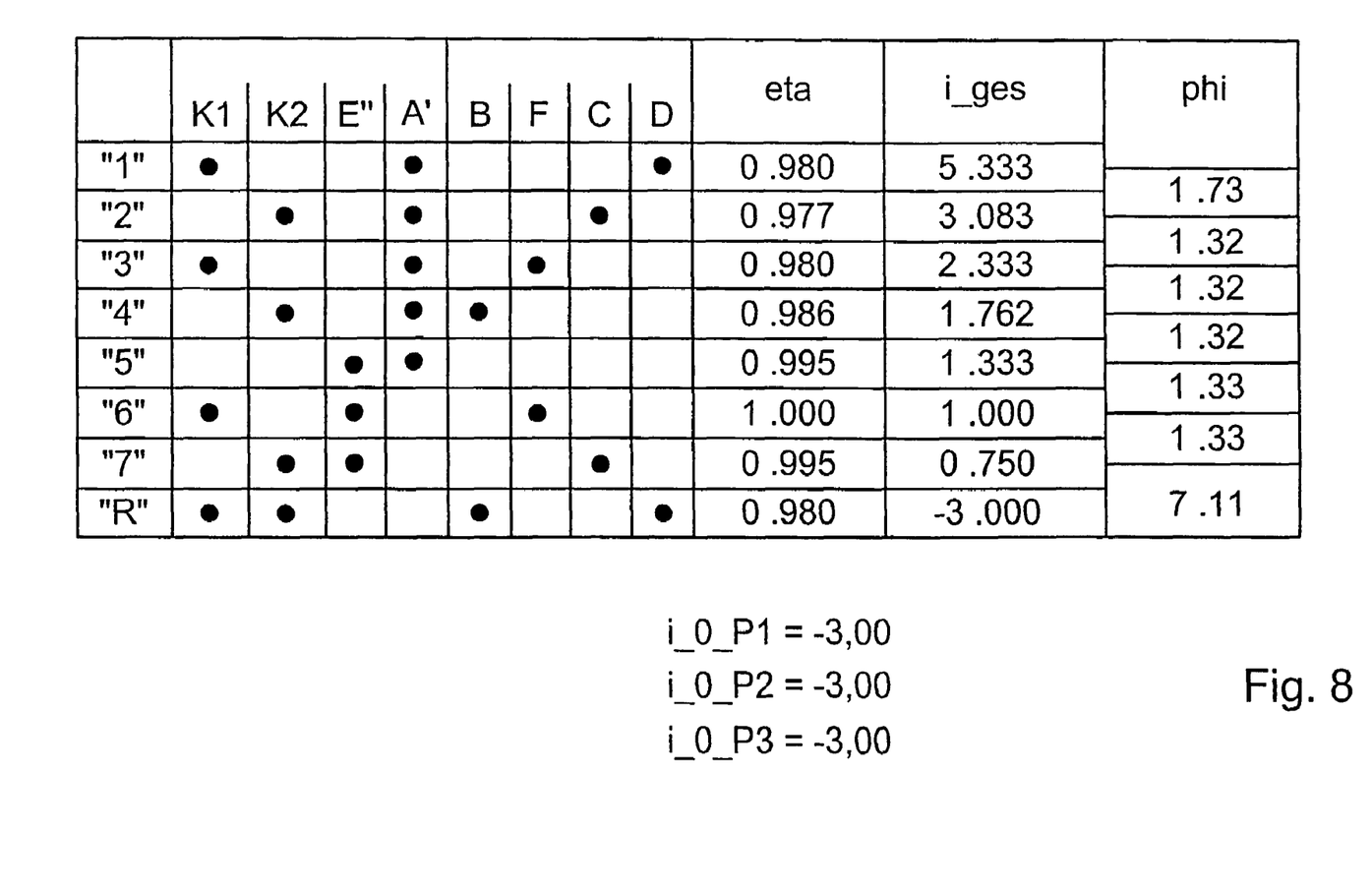
FIG. 8 is a schematic view, relating to the gear scheme of FIG. 5, which is made with the frictional shifting element as shown in FIG. 7.

FIG. 8 further shows another shifting scheme diagram, which principally represents the shifting scheme, shown in FIG. 6, whereby the shape-fit, shifting element A is replaced by a frictional brake A' as shown in FIG. 7.

In the case of all embodiment examples described and depicted, including examples in the more detailed and enlarged drawings of the invented planetary transmission, a well functioning control system exists, this being, advantageously, a mechanical control of the shape-fit elements to produce in the planetary transmission 1 result of such a nature, that the transmission output shaft 4 is arrested in motion and is held in the non-rotatable condition. This situation would, for example, be attained in that the main gear set, by the simultaneous engagement of several shape-fit, shifting elements, can be blocked and is able to anchor itself against the housing of the transmission or against a housing-affixed component of the housing of the transmission. With this method of procedure, it is possible that a parking block program, such as is found in many vehicles with automatic transmissions, advantageously may be omitted.

REFERENCE NUMERALS

| | |
|---|---|
| 1 | planetary transmission |
| 2 | component, affixed to transmission housing |
| 3 | input shaft from motor to transmission |
| 4 | output shaft, from transmission to drive wheels |
| 19, 20 | shaft |
| A, B, C, D, E, E', F | shape-fit, shifting elements |
| eta | efficiency of transmission |
| HR1, HR2, HR3 | internal gear |
| i_ges | total ratio |
| K1, K2, A', E'''' | frictional shifting element |
| phi | gear jump from stage to stage |
| P1, P2, P3 | planetary gear set |
| PR1, PR2, PR3 | planet gear |
| "R" | reverse gear |
| S1, S2, S3 | sun gear |
| ST1, ST2, ST3 | planetary gear carrier |
| "1" to "7" | gear stage |

The invention claimed is:

1. A dual clutch planetary transmission (1) comprising:
a first planetary gear set (P1),
a second planetary gear set (P2) and
a third planetary gear set (P3),
at least a first frictional shifting element (K1) and a second frictional shifting element (K2) for shifting to a desired one of various power paths in a power flow, and
first, second, third, fourth, fifth and sixth shape-fit shifting elements (A to F) for attaining various ratio stages within the power paths,
a housing (2),
a transmission input shaft (3), and
a transmission output shaft (4),
   wherein at least one of the first and the second frictional shifting elements (K1, K2) serves as a clutch,
   the first, the second, the third, the fourth, the fifth, and the sixth shape-fit shifting elements (A to F), the first and the second frictional shifting elements (K1, K2) and the first, the second, and the third planetary gear sets (P1, P2 and P3) are located within the housing,
   the first and the second frictional shifting elements (K1, K2) are located within the housing between at least the second, the third, the fourth, and the sixth shape-fit shifting elements (B, C, D, F) and the first, the second and the third planetary gear sets (P1 to P3),
   the first and the second frictional shifting elements (K1, K2) are directly connected by first half-clutches of the frictional shifting elements (K1, K2), with two different shafts (ST1, S1) of at least the first planetary gear set (P1) and second clutch-halves of the first and the second frictional shifting elements (K1, K2) are connectable with at least the second, the third, the fourth, the fifth, and the sixth shape-fit shifting elements (B to F),
   the first, the second, the third, the fourth, the fifth, and the sixth shape-fit shifting elements (A to F), the first and the second frictional shifting elements (K1, K2) and the first and the third planetary gear sets (P1 and P3) communicate such that at least one of the second, the third, the fourth, the fifth, and the sixth shape-fit shifting elements (B to F) is first engaged with a disengaged one of the first and the second frictional shifting elements (K1, K2) prior to engagement of the disengaged frictional shifting element (K1, K2) so upon simultaneous disengagement of an engaged frictional shifting element (K1 or K2) and engagement of the disengaged frictional shifting element (K2 or K2) continuous traction is achieved for each change in ratio stages.

2. The planetary transmission according to claim 1, wherein at least one of the first and the second frictional shifting elements (K1, K2) serves as a brake.

3. A dual clutch planetary transmission (1) comprising:
a first planetary gear set (P1),
a second planetary gear set (P2) and
a third planetary gear set (P3),
at least a first frictional shifting element (K1) and a second frictional shifting element (K2) for shifting to a desired one of various power paths in a power flow, and
first, second, third, fourth, fifth and sixth shape-fit shifting elements (A to F) for attaining various ratio stages within the power paths,
a housing (2),
a transmission input shaft (3), and
a transmission output shaft (4),
   wherein at least one of the first and the second frictional shifting elements (K1, K2) is a clutch, the first, the second, the third, the fourth, the fifth, and the sixth shape-fit shifting elements (A to F), the first and the second frictional shifting elements (K1, K2) and the first and the third planetary gear sets (P1 and P3) are located within the housing, the first, the second, the third, the fourth, the fifth, and the sixth shape-fit shifting elements (A to F), the first and the second frictional shifting elements (K1, K2) and the first and the third planetary gear sets (P1 and P3) communicate such that at least one of the second, the third, the fourth, and the sixth shape-fit shifting elements (B, C, D, F) is activated by engagement with a disengaged one of the first and second frictional shifting elements (K1, K2), not engaged in torque transmission, at initiation of the activation of the at least one of the second, the third, the fourth, and the sixth shape-fit shifting elements (B, C, D, F), and a gear stage exchange to change at least first, second, third and fourth gear stages by the first and second frictional shifting elements (K1, K2) is performed without any interruption of continuous traction, and the second, the third, the fourth, and the sixth shape-fit shifting elements (B, C, D, F) are axially located between an input end of the transmission input shaft (3) and the first and the second frictional shifting elements (K1, K2).

4. The planetary transmission according to claim 3, wherein the first and the second frictional shifting elements (K1, K2) operate at least one of a wet clutch and a dry clutch.

5. The planetary transmission according to claim 3, wherein the first, the second, the third, the fourth, the fifth, and the sixth shape-fit shifting elements (A to F) are synchronized shifting elements.

6. The planetary transmission according to claim 3, wherein an internal gear (HR1) of the first planetary gear set (P1) is connected with a carrier (ST3) of the third planetary gear set (P3).

7. The planetary transmission according to claim 3, wherein a sun gear (S2) of the second planetary gear set (P2) is connected with the transmission input shaft (3).

8. The planetary transmission according to claim 3, wherein a carrier (ST2) of the second planetary gear set (P2) is connected with an internal gear (HR3) of the third planetary gear set (P3).

9. The planetary transmission according to claim 3, wherein a carrier (ST3) of the third planetary set (P3) is connected to the transmission output shaft (4).

10. The planetary transmission according to claim 3, wherein by the first frictional shifting element (K1), a carrier (ST1) of the first planetary gear set (P1) and one of the sixth shape-fit shifting element (F) and the fourth shape-fit shifting element (D) can be brought into a mutually effective connection.

11. The planetary transmission according to claim 3, wherein a sun gear (S1) of the first planetary gear set (P1) and one of the second shape-fit shifting element (B) and the third shape-fit shifting element (C) can be connected with one another by the second frictional shifting element (K2).

12. The planetary transmission according to claim 3, wherein a sun gear (S3) of the third planetary gear set (P3) can be connected to the housing (2) by the first shape-fit shifting element (A).

13. The planetary transmission according to claim 3, wherein a sun gear (S3) of the third planetary gear set (P3) can be connected with the housing (2) by way of the first shape-fit shifting element (A').

14. The planetary transmission according to claim 3, wherein the transmission input shaft (3) is connected with the second frictional shifting element (K2) by the second shape-fit shifting element (B).

15. The planetary transmission according to claim 3, wherein the second frictional shifting element (K2) is connected with the housing (2) by the third shape-fit shifting element (C).

16. The planetary transmission according to claim 3, wherein the first frictional shifting element (K1) is connected with the housing (2) by the fourth shape-fit shifting element (D).

17. The planetary transmission according to claim 3, wherein the transmission input shaft (3) can be connected with the carrier (ST1) of the first planetary gear set (P1) as well as with the internal gear (HR2) of the second planetary gear set (P2) by the fifth shape-fit shifting element (E).

18. The planetary transmission according to claim 3, wherein the transmission input shaft (3) can be connected with a carrier (ST1) of the first planetary gear set (P1) as well as with an internal gear (HR2) of the second planetary gear set (P2) by another frictional shifting element (E").

19. The planetary transmission according to claim 3, wherein the first frictional shifting element (K1) can be connected with an internal gear (HR1) of the first planetary gear set (P1) as well as with a carrier (ST3) of the third planetary gear set (P3) by way of the sixth shape-fit shifting element (F).

20. The planetary transmission according to claim 3 wherein the first frictional shifting element (K1) can be connected with the transmission input shaft (3) by the second and the fifth shape-fit shifting elements (E' and B).

21. The planetary transmission according to claim 3, wherein the first planetary gear set (P1), the second planetary gear set (P2) and the third planetary gear set (P3) form a 3-carrier-6-shaft gear train unit.

22. The planetary transmission according to claim 21, wherein a carrier (ST1) of the first planetary gear set (P1) is connected to an internal gear (HR2) of the second planetary gear set (P2).

23. A dual clutch planetary transmission (1) comprising:
a first planetary gear set (P1),
a second planetary gear set (P2) and
a third planetary gear set (P3),
at least a first frictional shifting element (K1) and a second frictional shifting element (K2) for shifting to a desired one of various power paths in a power flow, and
first, second, third, fourth, fifth and sixth shape-fit shifting elements (A to F) for attaining various ratio stages within the power paths,
a housing (2),
a transmission input shaft (3), and
a transmission output shaft (4),
wherein at least one of the first and the second frictional shifting elements (K1, K2) serves as a clutch,
the first, the second, the third, the fourth, the fifth, and the sixth shape-fit shifting elements (A to F), the first and the second frictional shifting elements (K1, K2) and the first, the second, and the third planetary gear sets (P1, P2 and P3) are located within the housing,
the first and the second frictional shifting elements (K1, K2) are axially located within the housing between the second, the third, the fourth and the sixth shape-fit shifting elements (B, C, D, F) and the first, the second and the third planetary gear sets (P1 to P3),
the first, the second, the third, the fourth, the fifth, and the sixth shape-fit shifting elements (A to F), the first and the second frictional shifting elements (K1, K2) and the first, the second and the third planetary gear sets (P1, P2, P3) communicate such that at least one of the second, the third, the fourth and the sixth shape-fit shifting elements (B to F) is first engaged with a disengaged one of the first and the second frictional shifting elements (K1, K2), prior to engagement of the disengaged frictional shifting element (K1, K2), so upon simultaneous disengagement of an engaged one of the first and the second frictional shifting elements (K1 or K2) and engagement of the disengaged one of the first and the second frictional shifting elements (K2 or K2), continuous traction is maintained during each change in ratio stages.

* * * * *